Oct. 24, 1944.         T. A. DOWD              2,361,181
              STRADDLE-TYPE LOG HANDLING CART
                 Filed Oct. 21, 1943        2 Sheets-Sheet 2
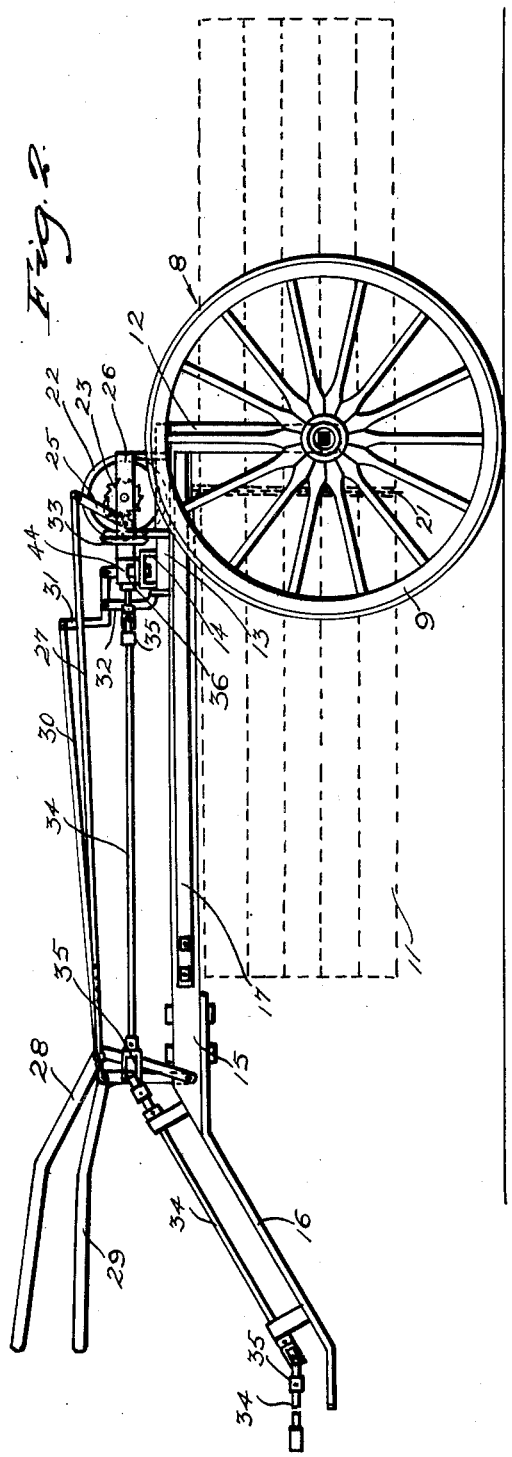
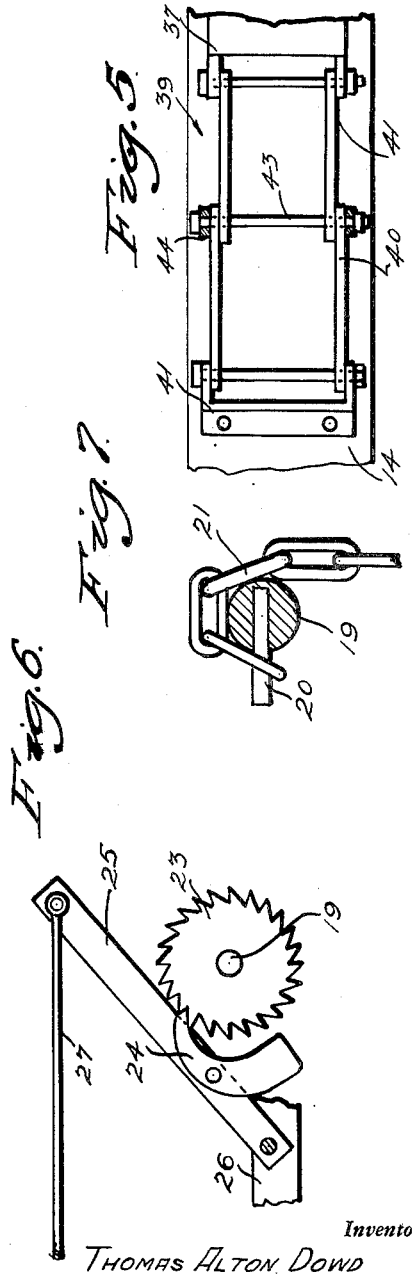
Inventor
THOMAS ALTON DOWD
By Clarence A. O'Brien
and Harvey B. Jacobson
Attorneys Patented Oct. 24, 1944

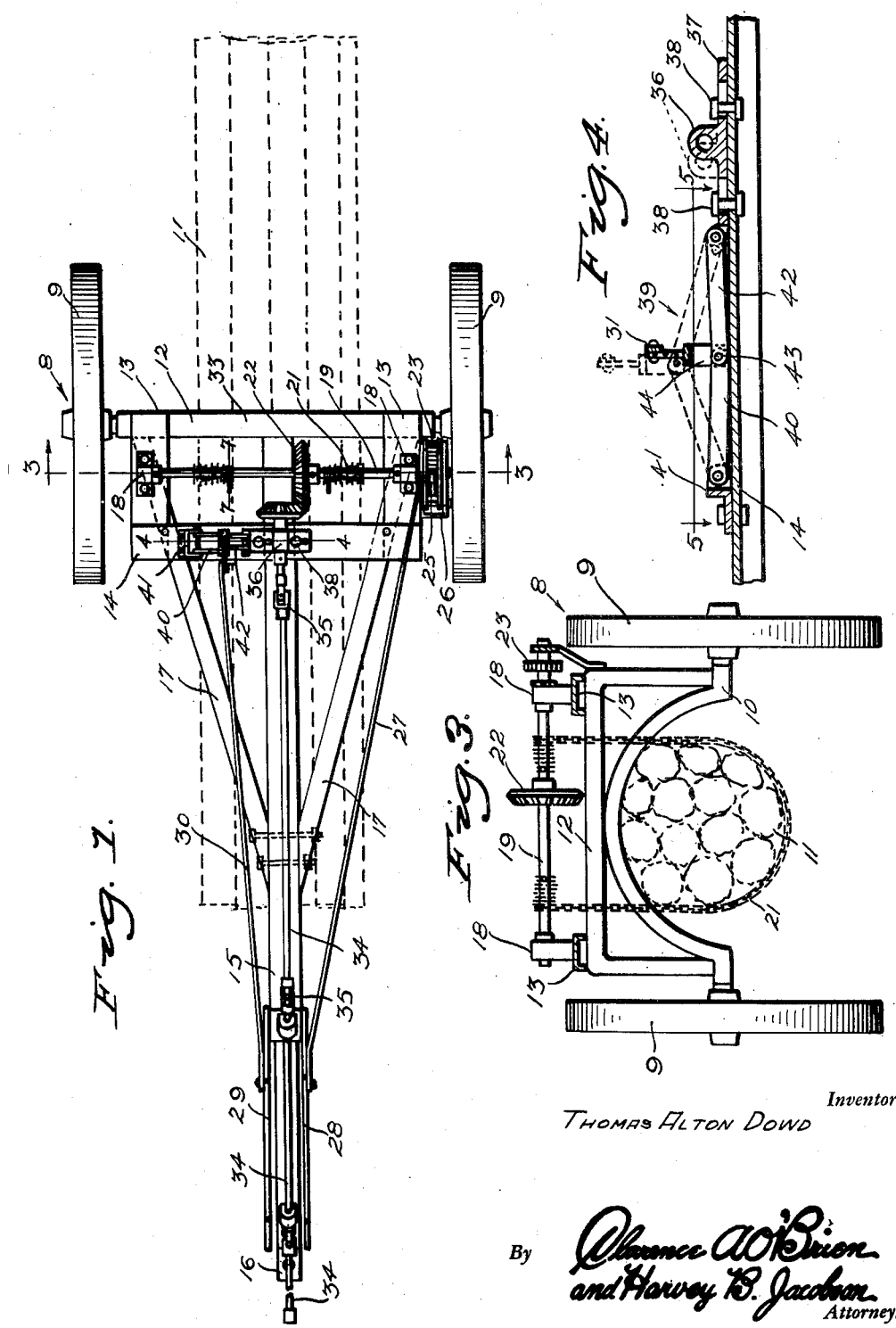

2,361,181

UNITED STATES PATENT OFFICE 2,361,181

STRADDLE-TYPE LOG HANDLING CART

Thomas Alton Dowd, Siler City, N. C.

Application October 21, 1943, Serial No. 507,163

3 Claims. (Cl. 214—65.3)

This invention relates to log and timber handling carts or wagons of the type in which the load is suspended on the under side of the cart between the wheels and which is provided with an arched axle structure carrying a frame, on which mechanisms are mounted for hoisting, lowering and fixing the load. These mechanisms usually embody a chain whose ends are fixed on a transverse shaft reeling and unreeling the chain when rotated and thereby either drawing the chain tightly against the load to hold the latter or loosening the same. As a rule the transverse shaft may be connected with a power drive for reeling the chain, is then locked in its position by releasable means such as a catch or a pawl and ratchet mechanism which is released when the chain is to be unreeled and the load is to be lowered or to be dropped.

From this it will be clear that the known mechanisms as usually arranged on log and lumber carts or wagons of the type described have to be provided with means for bringing into engagement the power drive and the shaft for reeling and unreeling the chain and with further means for releasing the locked shaft.

It has been proposed to connect the transverse shaft with the power take off shaft which, as a rule, is a longitudinal shaft, by means of a gear train consisting of the customary toothed wheels and by making one of these wheels axially movable on its axis so that it can be disconnected from engagement with its counterpart on the next shaft and it has moreover been proposed to effect this connection and disconnection by a lever connection whose hand operated control lever is arranged on the forward end of the frame.

The unlocking of the shaft, however, is simply performed by releasing the locking pawl on the spot on which it is active.

This arrangement does not, however, perform the very primitive functions in a satisfactory manner from the standpoint of mechanical safety or safety of the personnel.

The gear trains on account of the chain have to be arranged laterally where the personnel is working and as they can hardly be effectively protected are a source of potential danger for the personnel, especially as the operation starts suddenly with a jerk. The shifting of a gear wheel with front teeth into engagement when performed without care, as is to be expected in the case of personnel handling heavy loads, is mechanically unsatisfactory.

The chain releasing operation compelling the operator to work behind the wheel is a dangerous operation. Moreover, the different location of the controls deprives the operator of the opportunity to arrange the load properly, by alternately releasing and tightening the chain.

It is a primary object of this invention to obviate these difficulties and to improve the security, the ease with which operation may take place and the mechanical safety of the log cart or wagon.

This and further objects is attained by a special gear wheel shifting mechanism which is applicable to bevel gears and thereby permits a central arrangement, greater protection against accidents and a more satisfactory mechanical performance and it is moreover attained by mechanisms permitting to place all the control levers at one point, remote from the wheels at the end of the tongue of the vehicle. Thereby manipulation is simplified and facilitated. The security for the personnel is vastly improved and mechanical conditions are much more satisfactory than with known arrangements.

In the drawings, wherein like numerals are employed to designate like parts throughout the same:—

Figure 1 is a top plan view of a timber or log handling trailer-type cart constructed in accordance with the principles of this invention and showing the remote controlled devices forming the essence of the improvement hereinafter specifically described.

Figure 2 is a side elevational view of the arrangement disclosed in Figure 1.

Figure 3 is a section on the line 3—3 of Figure 1, looking in the direction of the arrows.

Figure 4 is an enlarged detail sectional and elevational view on the longitudinal line 4—4 of Figure 1.

Figure 5 is a horizontal section on the plane of the line 5—5 of Figure 4 looking downwardly in the direction of the arrows.

Figure 6 is a fragmentary detail elevational view of the pawl and ratchet mechanism.

Figure 7 is a section on the plane of the line 7—7 of Figure 1, the view being exaggerated to bring out the details.

The improved cart is a two-wheeled affair and is denoted by the numeral 8 and comprises wheels 9 with an arched axle 10 to accommodate the logs 11, whereby to cause the cart to straddle the logs. Mounted atop the axle is a foundation frame 12 of U-shaped form. This is brought out to advantage in Figure 3. The frame 12 is vertically disposed and serves as a satisfactory support for the adapter frame means. The latter means comprises a pair of short horizontal channel irons 13 and a complemental channel iron 14. The latter is parallel to the axle 10 and foundation frame 12. The numeral 15 designates a suitable tongue with an extension bracket or fixture 16 at the left hand end as shown in Figure 2. On opposite sides of the tongue are suitable diagonal braces 17.

With reference to Figures 1 and 3 it will be observed that appropriate bearings 18 on the angle members 13 serve to support the rotary chain winding and reeling shaft 19. This shaft as shown in Figure 7 is provided with anchoring studs or pins 20 to accommodate the free ends of the chain 21. This chain wraps around the group of logs as brought out to advantage in Figures 2 and 3. On the central portion of the shaft and keyed thereto is a shaft turning beveled gear 22. On one end of the shaft is a ratchet wheel 23. I direct attention to Figure 6 at this time in which figure it will be observed that the dog or pawl 24 which coacts with the ratchet wheel is carried by a fixture 25 pivoted on a support 26, that is, a relatively fixed support. The fixture 25 is rocked on its pivot by a remote control rod 27. This rod 27 is actuated back and forth by a bellcrank whose elongated lever or handle portion 28 extends beyond the frontal end portion of the tongue where it may be conveniently grasped to either engage or disengage the pawl. I direct attention conveniently to a parallel bellcrank unit 29 on the opposite side of the tongue which serves to operate a reciprocatory remote controlled rod 30. This rod is attached at its rear end to an L-shaped rocker 31 on a suitable fixture 32 as brought out in Figure 2. This arrangement functions in a manner to be hereinafter described.

I next call attention to the power take-off means, that is, the means which derives its power from the tractor (not shown) and delivers it to the beveled pinion 33. This comprises a plurality of companion shaft sections 34 arranged in appropriate bearing brackets and provided with suitable universal joints 35. The stub shaft in this shaft assembly is mounted for rotation in a longitudinally shiftable bearing 36 as brought out in Figures 1 and 4, particularly Figure 4. The bearing 36 is a part of a slotted bracket 37 slidable on anchoring pins 38 mounted on the channel member 14. In connection with this arrangement attention comes to the toggle means 39 the links 40 on one side being pivotally mounted on a yoke-bracket 41 and the links 42 on the opposite side being connected with the slidable bearing bracket 37. The respective pair of links 40 and 42 are pivoted together as at 43 where they are provided with a U-shaped actuating member 44 with which the L-shaped actuator 31 is pivotally connected. By rocking the L-shaped member 31 on its bracket 32 through the medium of the rod 30, the toggle links are moved from full to dotted line position as brought out in Figure 4.

It is evident that the toggle means 39 and bracket means 36—37 forms a shiftable clutch arrangement for the pinion 33. Assuming that the gears 33 and 22 are in mesh with each other as shown in Figure 1, it is evident that the shaft sections 34 transmit motion from means on the tractor (not shown) whereby to rotate the chain winding shaft 19. It is preferred that the gearing function to wind the chain to lift the load of logs and to at the same time bind the chain around the logs and force the logs up into the crown portion of the arched axle 10 as shown in Figure 3. During this operation, the pawl 24 simply slips over the cog or ratchet wheel and prevents retrograde rotation and serves to hold the chain tightly wrapped around the logs and wound on the shaft 19. When it is desired to lower the load, the remote controlling rod 30 by way of the bellcrank 29 is actuated. This, in turn, and through the medium of the L-shaped rocker bracket 31 and U-shaped fixture 44 serve to actuate the toggle. When the toggle is "broken," that is, moved to the dotted line position shown in Figure 4, it serves to shift the bearing bracket 36 to one side thus disengaging the pinion 33 from the beveled gear 22. Consequently, as soon as the pawl 24 is released to free the ratchet wheel, the weight of the logs acting on the chain 21 serves to unwind the chain from the shaft 19. The pawl 24 as before indicated is actuated through the medium of its carrier bracket 25 and remote control rod 27 and associated bellcrank 28. Consequently, we have the bellcranks 28 and 29 within the convenient reach of the user to first actuate the clutch and to secondly actuate the pawl and ratchet mechanism. This quick and reliable successive operation of devices serves to accomplish the aims desired.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. In a log cart of the type specified comprising a pair of wheels, an arched axle permitting the accommodation of logs between the wheels, a V-shaped frame carried by said axle, a chain holding said logs in their position, a transverse shaft mounted on said frame for reeling and unreeling said chain, a power take off shaft running longitudinally along the cart for transmitting power from an external source of power to the transverse shaft, gear wheels on both shafts adapted to be brought into engagement with each other and means for bringing said gear wheels into and out of engagement, comprising a transversely movable section on the power take off shaft carrying one of said gear wheels and connected with the remainder of the shaft by a universal joint, a bearing near the end of said shaft, slidably arranged for transverse movement and journalling the transversely movable section of the same and a hand operated mechanism for moving said bearing in a transverse direction.

2. In a log cart of the type specified comprising an arched axle and a frame, wheels attached to said axle, a tongue and a draft bar, a longitudinal shaft and a transverse shaft, the former adapted to be connected with an external source of power, the latter carrying a chain, reeled and unreeled by the rotational movement of the shaft, gear wheels on both shafts, means for bringing said gear wheels into and out of engagement, comprising a transversely movable section of the longitudinal shaft, carrying one of the gear wheels and a transversely movable bearing, means for imparting a transverse movement to said bearing comprising a control lever arranged near the tip of the tongue of the cart, and a connecting rod running from this lever to the mechanism for moving the transversely movable bearing, a pawl and ratchet mechanism on the transverse shaft for holding the same in the position into which it has moved and means for releasing said shaft comprising a control lever at the end of the tongue adjacent to the lever for controlling the engagement of the gear wheels.

3. In a log cart of the type specified, an arched axle, a frame carried thereby, wheels mounted on said arched axle, a tongue connected with the frame and a draft bar connected with the tongue, a longitudinal shaft, adapted to be connected with an external source of power, a transversely movable section on said longitudinal shaft, a transverse shaft, a chain for holding the load attached thereto, gear wheels on both shafts, the gear wheel on the longitudinal shaft being arranged near the end of the transversely movable section of the same, means for bringing said gear wheels into and out of engagement, comprising a transversely movable bearing at the end of the transversely movable section of the longitudinal shaft, and a mechanism to shift said bearing in a transverse direction, controlled by a hand operated lever arranged near the front end of the tongue which comprises a toggle lever mechanism connected with the bearing to be shifted transversely to convert said transverse movement in a movement at right angle thereto and a longitudinal pulling rod, pulling in a longitudinal direction upon operation of the hand control lever.

THOMAS ALTON DOWD.